United States Patent Office 3,266,920
Patented August 16, 1966

3,266,920
LEAK-INDICATING PAINTS FOR
LIQUID PROPELLANTS
James R. Griffith, Riverdale Heights, Md., assignor to the United States of America as represented by the Secretary of the Navy
No Drawing. Filed Dec. 27, 1962, Ser. No. 247,766
10 Claims. (Cl. 106—195)

The invention described herein may be manufactured and used by or for the Government of the United States of America for governmental purposes without the payment of any royalties thereon or therefor.

The present invention relates to indicating paints for use on rockets, missiles, fuel tanks and storage areas. More particularly, the invention relates to painted surfaces that undergo a color change whenever they are exposed to liquid rocket propellants.

The storage and handling of high-energy liquid rocket propellants are hazardous operations. Liquid oxidizers are often unstable and tend to detonate when contaminated with very small amounts of impurities. Some fuels are also toxic—the fumes if inhaled, will result in dangerous and sometimes fatal illness. All rocket fuels are of course highly flammable and will burn rapidly in air if ignited by a flame, static electricity, spark, or even heat arising from friction. The possibility of fire or explosion is particularly acute if propellants escape their containers.

The need for greatly improved propulsion systems for missiles and space vehicles has focused attention on fuels and oxidants which heretofore were considered highly impractical for such purposes. Compositions and mixtures that were earlier rejected because of extreme hazards associated with them are being recommended and tried in the quest for propellants with higher specific impulse. As a consequence of these hazards, engines which employ high-energy liquid fuels and oxidizers are often filled and sealed at the factory, and the packaged engines may then be transported and stored until ready for use. The fueled, storable type missile minimizes the hazardous task of transferring liquid propellants, although it imposes the need for constant vigilance to detect leakages and to locate and exact situs of escaping liquids.

In accordance with the present invention, there is provided for storable missiles, ship magazines, storage tanks, movable Dewars, etc., novel indicating surfaces which undergo vivid color changes on being exposed to propellant fuels and oxidizers. The indicating surfaces are formed preferably by painting them with suitable lacquers, enamels or other paints that incorporate therein suitable pigments and other color indicators. The dry painted surfaces and coatings formed in accordance with the present invention are capable of producing detectable color changes when they come in contact with propellant liquids, such as substituted hydrazines, amines, fuming nitric acids or elemental halogens. The present color pigments and other indicators which are incorporated in paints, lacquers, organic coatings, sealers, and the like, are sensitive to small amounts of fuel or oxidizer and are therefore capable of imparting a color change rapidly when these propellant liquids contact the paint film. The color responses of the present leak-indicating paints are of sufficient contrast that an observer can readily determine whether fuel or oxidant is escaping.

The present paint compositions increase the possibility that leakages of fuels or oxidizers will be detected before damage occurs. Leak-indicating paints also provide a visibly traceable means for locating defective or leaking elements.

It is therefore an object of the present invention to provide visible indication of escaping liquid propellants from missiles, fuel tanks, conduit lines and other containers in which hazardous liquid propellants are stored.

Another object of the invention is to provide lacquers, enamels and other paints for use on ships, missile sites, storage areas, etc. to form indicating surfaces that facilitate in the discovery of leakages and spillage of liquid propellants.

A further object of the invention is to provide indicating paints in which the color of a painted surface is altered, the color change being indicative of the propellant liquid fuel or oxidizer which contacts the surface.

A still further object of the invention provides painted surfaces which are sensitive to base type fuels and to strong oxidizers resulting in contrasting color changes that readily identify each of said components.

Other objects and advantages of the invention will hereinafter more fully appear and will be understood from the following detailed description.

The indicating paints of the present invention comprise paint or coating formulations, such as enamels, lacquers and other organic coatings or synthetic finishes which incorporate therein color additives or pigments that can be bleached in the presence of powerful oxidants, such as white or red fuming nitric acid. Said paint formulations also include therein acid-base indicators or mixtures thereof which produce a contrasting color change in the presence of hydrazine fuels. The paints are formulated into suitable colors by adding thereto certain indicating pigments in accordance with the invention; said pigments have the distinct property of being instantly bleached white in the presence of powerful oxidants. One such pigment is antimony sulfide which produces a gray color and may be used in paints or lacquers as a tint to impart a gray color. Copper phthalocyanine is used as a indicating pigment to produce a blue colored paint. These pigments are susceptible to powerful oxidizers and are readily bleached by them to form a nearly white paint film. The pigments are used preferably in concentrations that will not produce a too great color depth. If less pigment is used, a lighter colored paint is obtained but less contrast in indicator activity occurs. The indicator pigments should be sufficiently non-bleeding in oils and solvents and should provide adequate hiding power in the paint film.

A base indicator is also included in the paints in order to impart a distinct color change to the paint surface in the presence of hydrazine type fuels. The indicators used for this purpose are phenolphthalein and 1,3,5-trinitrobenzene. These indicators are initially colorless, but in the presence of strong base materials, the paint film is colored red. The phenolphthalein is effective for long periods when protected from direct exposure to sunlight. The inclusion of the trinitrobenzene indicator produces a blood red color in the presence of a strong base; however, it is subject to degradation by weathering and in particular by direct exposure to sunlight. When the phenolphthalein and the trinitrobenzene indicators are combined, they provide a sensitive response to base materials with a vivid blood red coloration on freshly painted surfaces. These base indicators will provide a strong color response on relatively new paint surfaces and will continue to provide color indication of diminishing indicator activity after the trinitrobenzene has lost its potency. The phenolphthalein alone produces a less vivid red or pink for relatively longer periods.

The present indicators are compatible with all well-known types of non-aqueous paint mixes, and resulting indicating paints can be spread to a dry, thin film to protect as well as to decorate a surface. Other pigments may be added in the present paints to improve flow, durability, crack-resistance, penetration and other properties which are desired in a paint film.

Paint formulations which are illustrative of the present invention but which are not limited thereto, may include for example an alkyd type enamel (Formula No. 6) conforming to Military Specification, MIL-E-001264B, and a lacquer formed of cellulose nitrate and conforming to Military Specification, MIL-L-7178 AM-3. Indicators are added to white enamel and lacquer to form the indicating paints of the examples given below.

*Example 1*

| Ingredient: | Percent by weight of total solids |
|---|---|
| Enamel, alkyd, white | 85 |
| Antimony Sulfide | 4.5 |
| 1,3,5-trinitrobenzene | 1.5 |
| Phenolphthalein | 9.0 |

The above formulation is based on the pigment content of the enamel. The ingredients added to the basic enamel must be of a sufficiently fine particle size to pass a 325 sieve. The paint formulations are prepared on a pebble-type paint mill for six hours to obtain adequate dispersion. The indicating formulation is a gray paint which may be used on ship magazines and other interior storing areas.

*Example 2*

| Ingredient: | Percent by weight of total solids |
|---|---|
| Enamel, alkyd, white | 88.6 |
| Copper phthalocyanine | 0.9 |
| 1,3,5-trinitrobenzene | 1.5 |
| Phenolphthalein | 9.0 |

The copper phthalocyanine is available in various pigment shades. A suitable pigment that provides a good contrast for color responses is Ramapo Blue manufactured by Du Pont Chemical Co. Tthe pigment is resinated to become flocculation resistant, and the individual particles are thus prevented from forming loose clusters or floc on the mill.

*Example 3*

| Ingredient: | Percent by weight of total solids |
|---|---|
| Lacquer, cellulose nitrate, white | 92 |
| Antimony sulfide | 3 |
| 1,3,5-trinitrobenzene | 1.7 |
| Phenolphthalein | 3.3 |

The indicators do not shorten the effective life of the lacquer, nor do they interfere with the normal drying process. The indicating lacquer is particularly suitable for coating a missile surface.

*Example 4*

| Ingredient: | Percent by weight of total solids |
|---|---|
| Lacquer, cellulose nitrate, white | 94.3 |
| Copper phthalocyanine* | 0.7 |
| 1,3,5-trinitrobenzene | 1.7 |
| Phenolphthalein | 3.3 |

* Ramapo Blue (Du Pont).

The enamel and lacquer formulations may be applied by any conventional method, for example, by brush, spray, dip or roller coat and then air dried to form a solid, adherent coating. The indicating enamels and laquers presented above will give the same response to basic fuel and oxidizers. Upon exposure to fuels containing amine or hydrazine derivatives, they immediately become blood red; upon exposure to an oxidant, such as red or white fuming nitric acid, they are immediately bleached white. The exposed colors form a good contrast with the background paint. The painted surfaces do not undergo color changes due to random environmental conditions.

The amount of indicating pigment is not critical but may be varied to a certain extent depending upon the type of paint and on the color depth desired. The trinitrobenzene which is soluble in paints may be included therein in about 0.5 to 6% by weight based on total solids. The phenolphthalein indicator, which is dispersed in the paint, may be included in varying amounts up to 10% by weight of total solids, depending upon the type of solvent present in the paint and upon the thickness and mass of the pigment-vehicle systems.

Other embodiments of leak-indicating paints may contain a yellow pigment, for example, dimethylaminoazobenzene (butter yellow) which turns into a brilliant scarlet in the presence of an oxidant. This paint may include calomel which colors the yellow paint a deep gray in the presence of an oxidant material. Diphenylamine may be employed in paints to form a deep purple color in the presence of oxidants.

The present indicating paints are especially suitable for indoor use on stored missiles and in the propellant storage areas. The base indicators have an effective indicating life of more than a year. The pigment additives should give adequate response for the life of the paint. Thus, the leak-indicating paints disclosed herein form sensitive coatings that produce rapid color change in the presence of propellant fuels and oxidants. The coatings provide an effective measure of control in detecting and preventing the escape of liquid propellant components.

It is to be understood that the particular paint formulations shown and described herein have been submitted as illustrative and operative embodiments of the present invention and that similar formulations and modifications thereof may be submitted without departing from the spirit and scope of the present invention.

What is claimed is:

1. A leak-indicating paint for liquid propellants of a base type fuel and an oxidizer comprising:
   a paint vehicle and dispersed solids,
   said solids including therein phenolphthalein and a coloring agent which is readily bleachable in the presence of said oxidizer.

2. A leak-indicating paint for liquid propellants of a base type fuel and an oxidizer comprising:
   a paint vehicle and pigment solids,
   said vehicle and pigment solids including therein phenolphthalein, 1,3,5-trinitrobenzene and a color pigment which is bleachable in the presence of said oxidizer.

3. A leak-indicating paint in accordance with claim 1 which includes 1,3,5-trinitrobenzene.

4. A leak-indicating surface film for liquid propellants of a base type fuel and an oxidizer,
   said surface film containing therein phenolphthalein, 1,3,5-trinitrobenzene and a color pigment which is readily bleachable in the presence of said oxidizer.

5. A leak-indicating lacquer for liquid propellants of a base type fuel and an oxidizer comprising:
   a lacquer solution,
   said solution containing therein phenolphthalein, 1,3,5-trinitrobenzene and antimony sulfide.

6. A leak-indicating lacquer for liquid propellants of a base type fuel and an oxidizer comprising:
   a lacquer solution,
   said solution containing therein phenolphthalein, 1,3,5-trinitrobenzene and copper phthalocyanine.

7. A leak-indicating enamel for liquid propellants of a base type fuel and an oxidizer comprising:
   an enamel mixture,
   said mixture containing therein phenolphthalein, 1,3,5-trinitrobenzene and antimony sulfide.

8. A leak-indicating coating in accordance with claim 4 in which the color pigment is antimony sulfide.

9. A leak-indicating coating in accordance with claim 4 in which the color pigment is copper phthalocyanine.

10. A leak-indicating enamel for liquid propellants of a base type fuel and an oxidizer comprising:
   an enamel mixture,
   said mixture containing therein phenolphthalein, 1,3,5-trinitrobenzene and copper phthalocyanine.

References Cited by the Examiner
UNITED STATES PATENTS

| | | |
|---|---|---|
| 2,249,867 | 7/1941 | Snelling. |
| 2,319,142 | 5/1943 | Lebach _____ 252—408 XR |
| 2,845,394 | 7/1958 | Thompson _____ 252—408 |
| 2,932,580 | 4/1960 | Clark et al. _____ 106—262 XR |

ALEXANDER H. BRODMERKEL, *Primary Examiner.*

J. H. WOO, *Assistant Examiner.*